(12) United States Patent
Schützmann et al.

(10) Patent No.: US 6,806,704 B2
(45) Date of Patent: Oct. 19, 2004

(54) DEVICES AND METHODS FOR INVESTIGATING THE MAGNETIC PROPERTIES OF OBJECTS

(75) Inventors: Jürgen Schützmann, Pfaffenhofen (DE); Ulrich Schanda, Holzkirchen (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/450,444

(22) PCT Filed: Dec. 17, 2001

(86) PCT No.: PCT/EP01/14894
§ 371 (c)(1),
(2), (4) Date: Oct. 17, 2003

(87) PCT Pub. No.: WO02/052512
PCT Pub. Date: Jul. 4, 2002

(65) Prior Publication Data
US 2004/0046551 A1 Mar. 11, 2004

(30) Foreign Application Priority Data

| Dec. 22, 2000 | (DE) | 100 65 868 |
| Dec. 22, 2000 | (DE) | 100 64 758 |
| Jan. 26, 2001 | (DE) | 101 03 379 |
| Jan. 26, 2001 | (DE) | 101 03 378 |

(51) Int. Cl.$^7$ .................................... G01R 33/032
(52) U.S. Cl. .................... 324/244.1; 324/261
(58) Field of Search .................... 324/244, 244.1, 324/260.261; 250/559.4

(56) References Cited

U.S. PATENT DOCUMENTS

| 4,112,367 A | | 9/1978 | Hepner et al. |
| 4,823,083 A | | 4/1989 | Gerard et al. |
| 5,025,147 A | * | 6/1991 | Durig et al. ................. 250/216 |
| 6,128,423 A | | 10/2000 | Shirai |

FOREIGN PATENT DOCUMENTS

| DE | 20 10 404 A1 | 6/1971 |
| EP | 00 86 373 A1 | 8/1983 |
| EP | 0 619 496 A2 | 10/1994 |

* cited by examiner

*Primary Examiner*—Bot LeDynh
(74) *Attorney, Agent, or Firm*—Bacon & Thomas, PLLC

(57) ABSTRACT

The invention relates to apparatuses and a corresponding method for examining magnetic properties of objects, in particular sheet material, such as bank notes (20). The apparatuses comprise a magneto-optic layer (10) whose optical properties are influenceable by the magnetic properties of the sheet material (20), a light source (11) for producing light that is coupled into the magneto-optic layer (10), and a detector (13) for detecting light that is transmitted and/or reflected by the magneto-optic layer (10).

For reliable examination of the magnetic properties of sheet material it is provided that the direction of propagation of the coupled-in light extends parallel to a base surface (9) of the magneto-optic layer (10).

The invention permits the magnetic properties in particular of sheet material with areas emitting very weak magnetic fields to be examined with very high sensitivity and reliability.

9 Claims, 3 Drawing Sheets

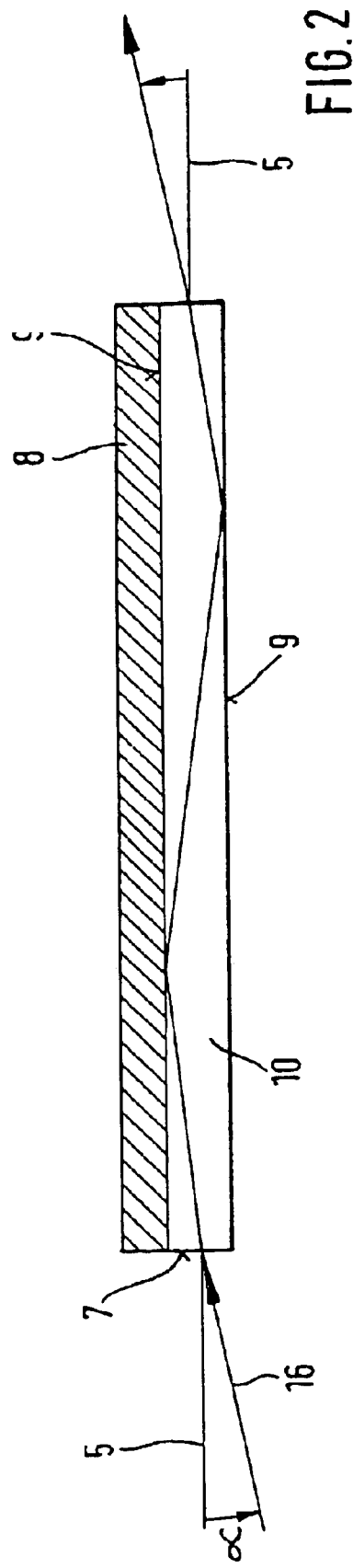
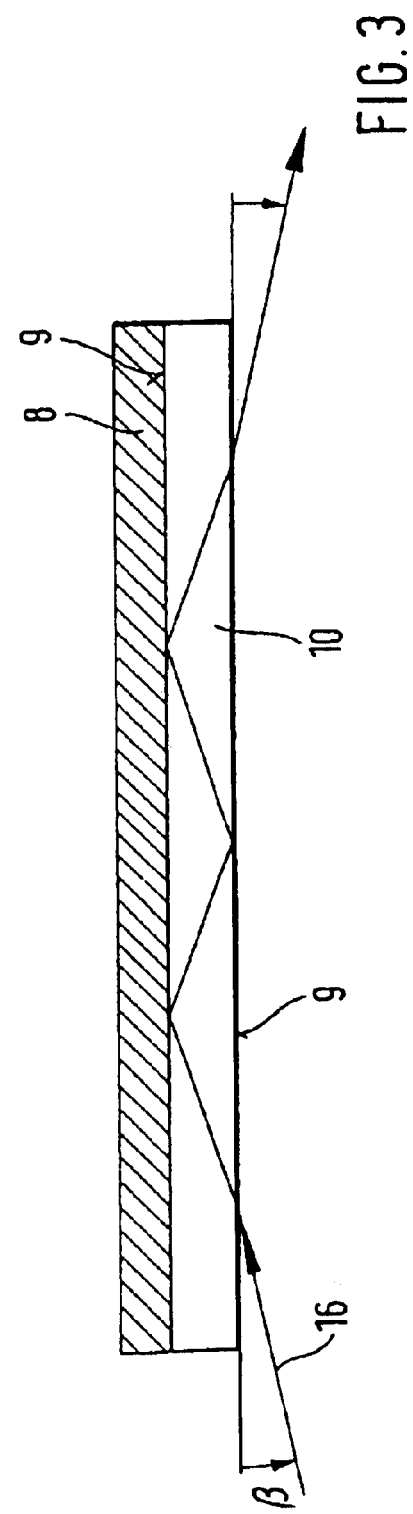

DEVICES AND METHODS FOR INVESTIGATING THE MAGNETIC PROPERTIES OF OBJECTS

This invention relates to apparatuses and a method for examining magnetic properties of objects, in particular sheet material, such as bank notes. The apparatuses comprise a magneto-optic layer whose optical properties are influenceable by the magnetic properties of the object, a light source for producing light that is coupled into the magneto-optic layer, and a detector for detecting light that is transmitted and/or reflected by the magneto-optic layer.

To guarantee high forgery-proofness, bank notes are provided with magnetic features, among other things. During automated bank note testing in bank note processing machines, bank notes are therefore also examined for their magnetic properties to distinguish counterfeits or suspected counterfeits from authentic bank notes.

Examination of the magnetic properties of bank notes is usually effected in this connection using inductive measuring heads, Hall elements or magnetoresistive elements, such as field plates or thin permalloy layers.

In addition, it is known to examine the magnetic properties of bank notes using magneto-optic layers. A suitable apparatus is known for example from German laid-open print DE 197 18 122 A1. A magneto-optic reflector layer with a high magnetic Kerr effect is illuminated with polarized light and the reflected light detected after passing through a polarizing filter. If a bank note under examination is brought close behind the reflector layer, the magnetic leakage flux of the magnetic areas of the bank note influences the optical behavior of the reflector layer, thereby changing the polarization direction of the detected light. From the measured change of polarization one can then infer the magnetic properties of the sheet material.

Compared to other measuring methods and assemblies, e.g. inductive measuring heads, the use of magneto-optic layers has the advantage that they allow high spatial resolution and the measurement of magnetic flux is independent of the speed of the bank note relative to the measuring system.

Examination of the magnetic properties of bank notes by machine involves in particular the problem that very small magnetic flux densities must be detected to be able to guarantee a sufficiently precise and reliable check of authenticity. This is because, firstly, the leakage flux caused by the individual magnetic areas of the bank notes is very small and, secondly, the typical distances between bank note and magneto-optic layer cannot be reduced at will due to the high transport speed required in bank note processing machines, as this would otherwise lead to elevated wear of the bank notes to be checked and individual sensor components and in addition result in an elevated risk of jams.

It is the problem of the present invention to provide apparatuses and a method that allow more precise and reliable examination of magnetic properties of sheet material.

This problem is solved by the apparatus according to claims 1 or 9 and by the method according to claim 9.

The solutions to the problem by the apparatuses according to claims 1 and 9 are based on the common inventive idea of increasing the change, i.e. rotation, of the polarization direction of the light coupled into the magneto-optic layer. This increases the sensitivity of the measuring apparatus so that even very small magnetic fields can be examined with sufficiently high precision and reliability. The rotation of the polarization direction is increased in the apparatus according to claim 1 by increasing the optical path length of the light passing through the magneto-optic layer. In the apparatus according to claim 9 this is attained by a suitable structure of the system consisting of magneto-optic layer and substrate.

According to claim 1, it is provided that the light source and the magneto-optic layer are so disposed that the direction of propagation of the light coupled into the layer extends substantially parallel to a base surface of the magneto-optic layer. Light beams also extend parallel to the base surface of the layer according to the invention when they are inclined relative to the base surface of the layer slightly, i.e. up to an angle of a few degrees.

As is well-known, the angle of polarization rotation is proportional to the optical path length of the light passing through the magneto-optic material in the magneto-optic Faraday effect. Since the light is coupled in substantially parallel to the layer according to the invention, the optical path of the light is increased by several orders of magnitude compared to coupling in substantially perpendicular to the base surface as known from the prior art. Accordingly, the angle of polarization rotation increases so that a distinct increase in sensitivity is obtained.

According to claim 9, it is provided that the magneto-optic layer consists at least partly of iron garnets and is applied to a substrate consisting at least partly of gallium garnets, whereby oxygen is substituted at least partly by sulfur in the gallium garnets of the substrate. Iron garnets are formed by compounds based on iron garnet ($RE_3Fe_5O_{12}$), whereby $RE_3$ comprises three rare earth metal elements, and iron (Fe) and/or oxygen (O) can be substituted at least partly by one or more other elements in each case. Gallium garnets are compounds based on gallium garnet ($RE_3Ga_5O_{12}$), whereby $RE_3$ comprises three rare earth metal elements, and gallium (Ga) and/or oxygen (O) can be substituted at least partly by one or more other elements in each case.

The at least partial substitution of oxygen in the substrate by sulfur increases the lattice constant of the substrate, which in turn permits a substitution of rare earth metals, e.g. yttrium, in the magneto-optic layer by sensitivity-increasing elements, in particular bismuth, with a larger atomic and/or ionic radius. This permits the angle of polarization rotation, which is proportional to a material constant influenced by the composition of the magneto-optic material in the magneto-optic Faraday effect, to be distinctly increased.

Altogether, the apparatuses according to claim 1 and 9 permit more precise and reliable examination of even very small magnetic fields, in particular on bank notes. Simultaneously, the high sensitivity of the inventive apparatuses permits a relatively large distance between bank note and magneto-optic layer, so that high transport speeds of the bank notes under examination can be obtained along with lower wear and a distinctly reduced risk of jams.

The inventive apparatuses furthermore permit high spatial resolutions to be obtained, so that they are especially suitable for examining the magnetic properties of printed images produced with magnetic ink, of magnetic layers or of magnetic, in particular interrupted or coded, security threads or security bands on or in bank notes or security documents.

The invention will be explained in more detail in the following with reference to examples shown in figures, in which:

FIG. 2 shows an example of light propagation extending substantially parallel to the base surface of the layer, light being coupled in laterally;

FIG. 3 shows a further example of light propagation extending substantially parallel to the base surface of the layer, light being coupled in through a base surface of the layer.

Figure 1:
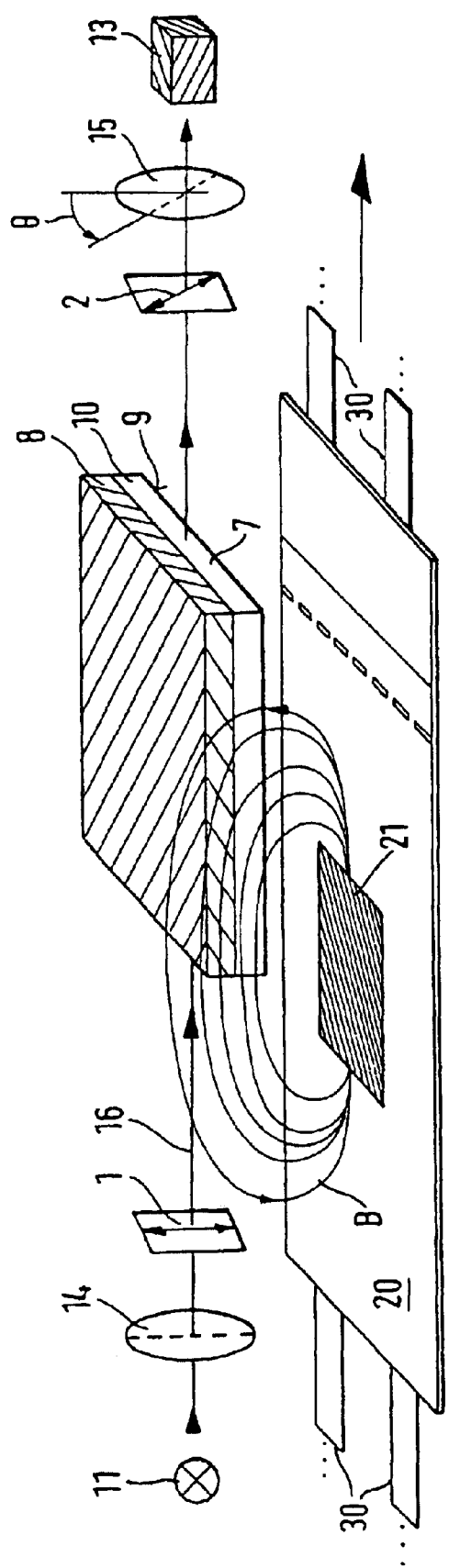
FIG. 1 shows an inventive apparatus with light extending parallel to the base surface of the magneto-optic layer.

FIG. 1 shows an example with light extending parallel to base surface 9 of magneto-optic layer 10. Bank note 20 with magnetic area 21 is transported by transport system 30 (shown only sketchily) into the proximity of magneto-optic layer 10. Light source 11, preferably a laser or laser diode, magnetic layer 10 and detector 13, preferably a photodiode, are so disposed that the direction of propagation of the light coupled into layer 10 extends substantially parallel to base surface 9 of layer 10 and the light exiting from layer 10 can be detected by detector 13. Substantially parallel propagation also means according to the invention that magneto-optic layer 10 can be inclined relative to coupled-in light beam 16 slightly, i.e. few angular degrees, to obtain a maximum optical path of the coupled-in light through layer 10. Polarizing filters 14 and 15 are disposed between magneto-optic layer 10 and light source 11, and magneto-optic layer 10 and detector 13, respectively. The light passed by polarizing filter 14 has defined polarization 1 before entering magneto-optic layer 10. Depending on the course and thickness of the magnetic stray field coming from magnetic area 21 of bank note 20, the optical properties of magneto-optic layer 10 are influenced and consequently the polarization rotation of the light passing through the layer changed (Faraday effect). After passing through the layer, the light has polarization 2 which is generally rotated by polarizing angle θ relative to polarization 1 of entering light 16. Depending on the size of polarizing angle θ and the position of polarizing filter 15, the intensity detected by detector 13 varies, from which intensity the magnetic properties of examined bank note 20 can then be inferred.

FIG. 2 shows an example of a direction of propagation of the coupled-in light extending substantially parallel to base surface 9 of layer 10. Light 16 to be coupled in hits magneto-optic layer 10 in the area of side surface 7 and encloses with perpendicular 5 extending parallel to base surface 9 flat angle α, which is typically in the range between about 0 and 12 degrees. Layer 10 then acts on the thus coupled-in light like a waveguide on whose boundary surfaces, i.e. base surfaces 9, the obliquely incident light is reflected with negligible losses and propagated substantially parallel to base surface 9 of layer 10. Reflection is effected in the shown example on the boundary surface between layer 10 and the surroundings or substrate 8.

As shown in FIG. 3, light can be coupled in alternatively in the area of base surface 9 of layer 10. In this example, angle β that is enclosed by light 16 to be coupled in with base surface 9 is to be selected accordingly small, i.e. smaller than about 10 degrees, to obtain a maximum optical path in layer 10 at the same time as low losses from multiple reflections. If substrate 8 on which magneto-optic layer 10 is located is transparent to light 16 to be coupled in, coupling can also be done through substrate 8.

Figure 4:
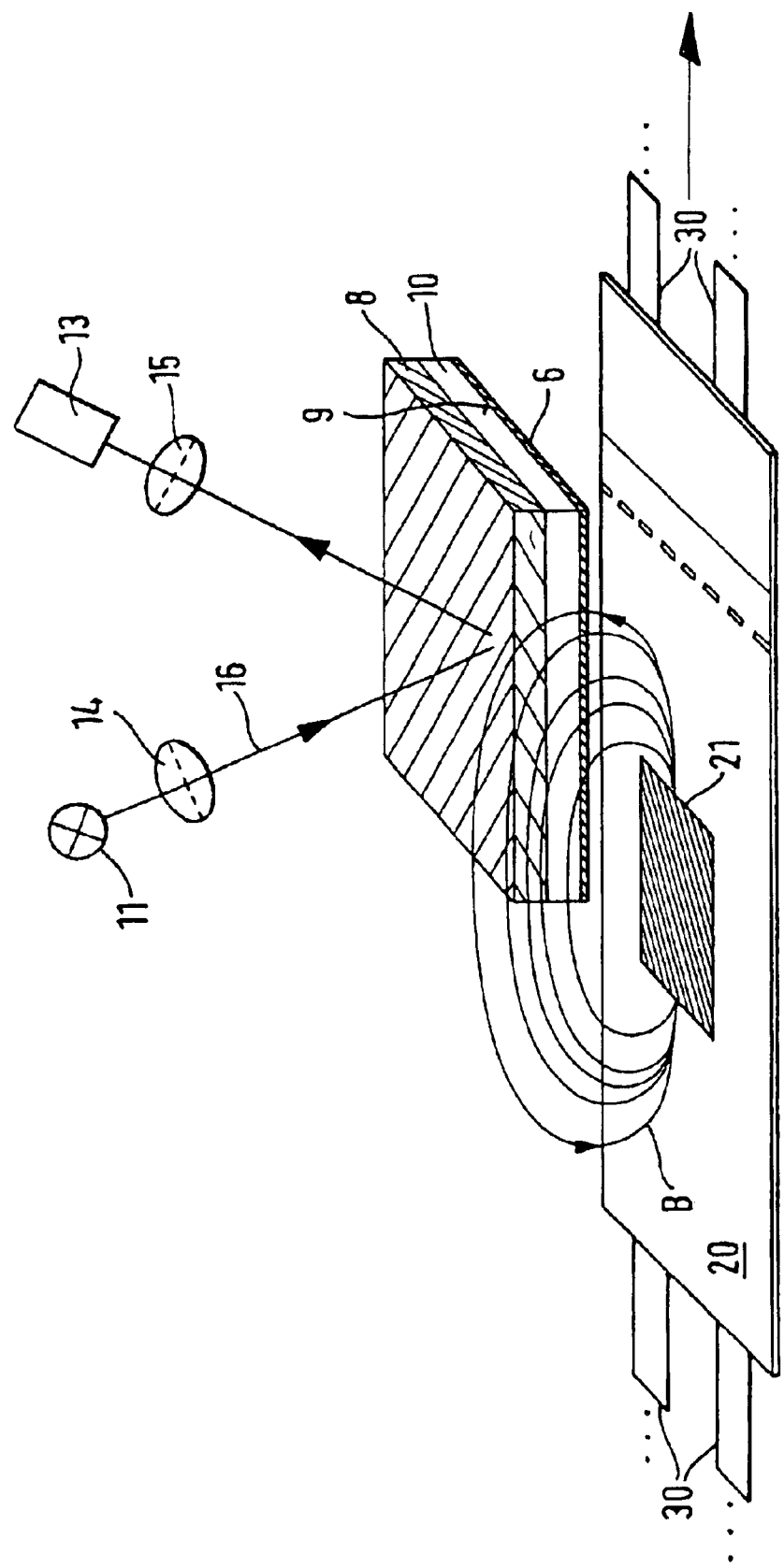
FIG. 4 shows an apparatus with an inventive structure of the substrate-layer system.

FIG. 4 shows the embodiment of an apparatus with a substrate-layer system consisting of substrate 8 and layer 10 and having the inventive composition of gallium or iron garnets, whereby oxygen is substituted at least partly by sulfur in the gallium garnets of substrate 8. Since the sensitivity of the magneto-optic layer is distinctly increased in this composition of the substrate-layer system, in particular with substitu-substitution of rare earth metal elements of layer 10 by bismuth, a relatively short optical path of the coupled-in light through layer 10 is already sufficient for guaranteeing great reliability and precision in the examination of small magnetic fields. Therefore light source 11 and magneto-optic layer 10 are so disposed in this example that light 16 to be coupled in is coupled in at a steep angle, which is typically between 70 and 90 degrees, to base surface 9 of layer 10. As in FIG. 1, this example also has transport system 30 for transporting bank note 20 with magnetic area 21 past layer 10. In addition, polarizing filters 14 and 15 are likewise disposed between magneto-optic layer 10 and light source 11, and magneto-optic layer 10 and detector 13, respectively, to permit analysis of the rotation of polarization direction of the light caused by layer 10.

In the shown example of FIG. 4, substrate 8 is transparent to light 16 to be coupled in. Base surface 9 of magneto-optic layer 10 facing away from substrate 8 is furthermore provided with mirror plating 6. The coupled-in light first passes through substrate 8 and then layer 10, is subsequently reflected on mirror plating 6 and after a further pass through layer 10 and substrate 8 can be detected by detector 13.

Alternatively, layer 10 can be applied to substrate 8 opaque to coupled-in light (not shown). In this case, coupling is done directly into layer 10. Light passing through layer 10 is then reflected at least partly on the boundary surface between layer 10 and substrate 8 and after another pass through layer 10 can be detected by detector 13.

Magneto-optic layer 10 is generally applied to crystalline substrate 8 by different chemical or physical techniques, such as liquid phase epitaxy or PVD processes like sputtering or laser ablation, and preferably consists of iron garnets. Iron garnets according to the invention are compounds based on iron garnet ($RE_3Fe_5O_{12}$), whereby $RE_3$ comprises three rare earth-metal elements, in particular yttrium (Y), thulium (Tm) or lutetium (Lu), and whereby iron (Fe) and/or oxygen (O) can be substituted at least partly by one or more other elements in each case. The three rare earth metal elements ($RE_3$) can be three identical rare earth metal elements or any combination of different rare earth metal elements.

The material used for the substrate is preferably gallium garnets. This refers according to the invention to compounds based on gallium garnet ($RE_3Ga_5O_{12}$), whereby $RE_3$ comprises three rare earth metal elements, in particular scandium (Sc), samarium (Sm), gadolinium (Gd), thulium (Tm) or lutetium (Lu), and whereby gallium (Ga) and/or oxygen (O) can be substituted partly by one or more other elements in each case. The three rare earth metal elements ($RE_3$) can be three identical rare earth metal elements or any combination of different rare earth metal elements.

To increase the sensitivity of the magneto-optic layer, at least one rare earth metal element (RE), in particular yttrium (Y), in the iron garnets can be substituted at least partly by bismuth (Bi).

However, increasing substitution of rare earth metals (RE), in particular yttrium (Y), by bismuth (Bi), increases the lattice mismatch of substrate and magneto-optic layer, which can lead to strains and dislocations in the magneto-optic layer and counteracts the increased sensitivity of the magneto-optic layer. This lattice mismatch can be reduced for example by substituting oxygen (O) at least partly by sulfur (S) in the gallium garnets of the substrate. Alternatively or additionally, this can be obtained by substituting gallium (Ga) and/or at least one rare earth metal element (RE) at least partly by calcium (Ca) and/or magnesium (Mg) and/or zirconium (Zr) in the gallium garnets of the substrate.

The lattice mismatch between the substrate and magneto-optic layer 10 based on iron garnets can also be reduced by substituting iron (Fe) in magneto-optic layer 10 at least partly by gallium (Ga) and/or $Al^{3+}$ ions.

The following table shows three examples (1 to 3) of layer systems comprising a magneto-optic layer and an accordingly adapted substrate:

| | Magneto-optic layer | Substrate |
|---|---|---|
| 1 | $YBi_2Fe_{3.8}Ga_{1.2}O_{12}$ | $Gd_3Ga_5(Mg,Zr,Ca)S_{12}$ |
| 2 | $Lu_{3-x}Bi_xFe_{5-y-z}Ga_yAl_zO_{12}$, where $0.5 < x < 2$; $0 < y < 2$ and $0 < z < 1$. | $Gd_3Ga_5(Mg,Zr,Ca)O_{12}$ |
| 3 | $Lu_{3-x}Bi_xFe_{3.8}Ga_{1.2}O_{12}$, where $1 < x < 1.4$ | $Gd_3Ga_5(Mg,Zr,Ca)O_{12}$ or $Gd_3Ga_5(Mg,Zr,Ca)S_{12}$ |

In the magneto-optic layers of all examples 1 to 3, the rare earth metal element, yttrium (Y) or lutetium (Lu), of the iron garnets is substituted partly by bismuth (Bi) to obtain an increase in the sensitivity of the layer. In the shown examples, iron (Fe) is furthermore replaced partly by gallium (Ga), in example 2 iron (Fe) is in addition substituted partly by aluminum ($Al^{3+}$) to reduce the lattice mismatch with the substrate. The stated ranges of indexes x, y and z in examples 2 and 3 allow a great number of realizable compositions of the magneto-optic layers.

In all shown examples, the substrates are gadolinium-gallium garnets with magnesium (Mg), zirconium (Zr) and calcium (Ca) incorporated in their lattice. Other rare earth metals, in particular samarium (Sm), can fundamentally be used instead of gadolinium (Gd). For improved lattice match with the particular magneto-optic layer, oxygen (O) was replaced by sulfur (S) in the substrate layers of examples 1 and 3.

In the above-described examples, light source 11 and magneto-optic layer 10 are preferably so disposed that light 16 emanating from light source 11 hits magneto-optic layer 10 at the Brewster angle. The Brewster angle is the angle whose tangent is equal to the refractive index of magneto-optic layer 10. One part of light 16 hitting magneto-optic layer 10 at the Brewster angle is reflected and has a polarization perpendicular to the plane of incidence, so-called s polarization, while the other part of light 16 incident at the Brewster angle is refracted into the layer and has a polarization parallel to the plane of incidence, so-called p polarization.

The Brewster angle is preferably between about 60 and 70 degrees. At typical refractive indexes of the used garnets between about 2.2 and 2.4, this angle is in particular between about 66.5 and 67.4 degrees.

Preferably, light 16 hitting magneto-optic layer 10 at the Brewster angle has a polarization parallel to the plane of incidence, so-called p polarization. In this case, virtually no light is reflected and almost all the light hitting magneto-optic layer 10 is coupled into the layer. This obtains especially effective light coupling without requiring an antireflection coating of layer 10.

What is claimed is:

1. Apparatus for examining magnetic properties of objects such as sheet material including bank notes, comprising
    a magneto-optic layer having a base surface and optical properties influenceable by the magnetic properties of an object to be examined,
    a light source arranged to produce light that is coupled into the magneto-optic layer, and
    a detector arranged to detect light that is transmitted and/or reflected by the magneto-optic layer, wherein the light source and the magneto-optic layer are so disposed that the direction of propagation of the light coupled into the magneto-optic layer extends substantially parallel to the base surface of the magneto-optic layer.

2. An apparatus according to claim 1, wherein the light source and the magneto-optic layer are so disposed that the light is coupled into the magneto-optic layer in the area of a side surface thereof.

3. The apparatus according to claim 2, wherein the light source and the magneto-optic layer are so disposed that the light to be coupled into the magneto-optic layer in the area of a side surface thereof encloses a flat angle with a base surface of the magneto-optic layer.

4. The apparatus according to claim 1, wherein the light source and the magneto-optic layer are so disposed that the light is coupled into the magneto-optic layer in the area of a base surface thereof, the light to be coupled into the magneto-optic layer enclosing a flat angle with the base surface of the magneto-optic layer.

5. The apparatus according to claim 1, wherein at least one polarizing filter is disposed between light source and magneto-optic layer and/or between detector and magneto-optic layer.

6. The apparatus according to claim 1, wherein a photo-diode is provided as a detector.

7. The apparatus according to claim 1, including a laser as a light source.

8. An apparatus according to claim 1, wherein the magneto-optic layer is applied to a substrate that serves as a support for the magneto-optic layer.

9. A method for examining magnetic properties of sheet material such as bank notes, comprising the steps:
    coupling light into a magneto-optic layer having a base surface and whose optical properties are influenceable by the magnetic properties of a sheet material to be examined, and
    detecting the light transmitted and/or reflected by the magneto-optic layer
wherein
    the light is coupled into the magneto-optic layer so that its direction of propagation extends substantially parallel to the base surface of the magneto-optic layer.

* * * * *